United States Patent [19]
Nilsson

[11] 3,933,396
[45] Jan. 20, 1976

[54] BALL BUSHING
[75] Inventor: Sven Walter Nilsson, Partille, Sweden
[73] Assignee: AB SKF Nova, Goteborg, Sweden
[22] Filed: Mar. 11, 1974
[21] Appl. No.: 449,783

[30] Foreign Application Priority Data
Apr. 24, 1973 Sweden................................ 7305684

[52] U.S. Cl. .................................. 308/6 C; 64/27 L
[51] Int. Cl.² .......................................... F16C 31/06
[58] Field of Search......... 308/6 R, 6 C, 26; 64/237, 64/27 L

[56] References Cited
UNITED STATES PATENTS
3,540,782    11/1970    Worm .................................. 308/6 C

*Primary Examiner*—Richard A. Schacher
*Assistant Examiner*—Robert Saifer
*Attorney, Agent, or Firm*—Daniel M. Rosen

[57] ABSTRACT

A ball bushing device adapted to be mounted on a shaft, comprising a sleeve element containing a bore defined by an interior wall surface, plural balls within the sleeve, and a raceway structure between the balls and the sleeve element, the raceway structure having curved elastic plate members and having a generally concavo-convex surface facing toward the shaft and the concave surface facing toward the sleeve element.

3 Claims, 2 Drawing Figures

BALL BUSHING

This invention relates to ball bushings, particularly bushings of the kind which consists of a sleeve and a shaft, and of balls guided in a holder arranged therebetween, which holder is provided for the carrying of the balls with separate raceways inserted into the sleeve.

Ball bushings of this type are known, for example, as shown in the Swedish Laid Out Document No. 349,370. The raceways arranged therein are adjustable through a small angle from the direction of the bushing shaft, due to the fact that the raceway sides abutting the bore wall of the sleeve are chamfered toward the ends, as a result in normal position, only the central portion of the raceways in question abut the sleeve bore wall. This renders a certain obliqueness of the shaft possible relative to the sleeve and, in addition, to a certain extent eliminates high edge loads in the bushing with a possible bending of the shaft.

At such a bushing, however, the loaded balls in the central portion of the sleeve are subjected to high stresses because the raceways in this area are in substantially rigid contact with the bore wall of the sleeve. This implies poor radial resilience properties of the raceway. This arrangement, moreover, does not permit the sleeve being eccentrically placed relative to the shaft, which implies that if two bushings support, with rigid connection, a common machine element and are disposed each on one of two parallel shafts, as is usually the case, these shafts must be in parallel with high accuracy in order to permit axial movement of the machine element.

In accordance with the object and means of the present invention, an arrangement is obtained in which overload on any of the loaded balls is avoided, the balls are fed smoothly into the loaded zone, and a certain eccentricity between sleeve and shaft is permissible.

The invention is described in greater detail in the following, with reference to the accompanying drawing.

BRIEF DESCRIPTION OF DRAWING

FIG. 1 in the drawing schematically shows a view of a ball bushing, to which the arrangement according to the invention is applied, and where 1 designates the sleeve, 2 the shaft and 3 the balls comprised in the bushing. The bushing further includes a holder (not shown) intended for guiding the balls. The raceways are designated by 4. FIG. 2 shows that by means of the raceway according to the invention high edge loads upon deflection of the shaft are avoided. The raceways, which preferably are made of hardened steel, are inserted and guided in grooves in the inner surface of the sleeve. The raceways are so curved that their contact surfaces with the balls are convex, and their surfaces abutting the sleeve are concave. This implies that the central portions of the raceways, at least in unloaded state, are located closer to the shaft surface then their end portions, and that the central portions are located at a certain distance from the sleeve bore wall surface. This in its turn implies that the central portions of the raceways upon loading can perform a resilient motion in radial direction. At increasing load on the bushing, the balls are thereby also loaded to an increasing degree at the end portions of the raceways. As a result a more uniform distribution of the load over the entire bushing length is realized.

Figure 1:
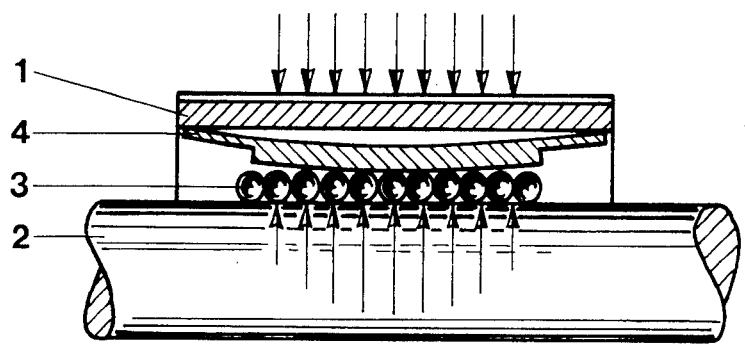
FIGS. 1 and 2 are sectional elevation views of the present invention under various conditions.
Figure 2:
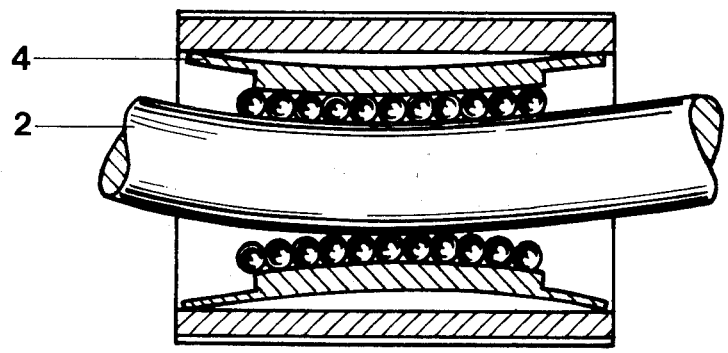

Due to the design of the raceways, the balls, upon their feeding into the loaded zone, are subjected to a continuously increasing load, which implies a smooth feed into the loaded zone.

In order to lock the raceways in the axial direction, the holder, for example, can be formed with an outwardly directed end flange, which prevents motion of the raceway in one direction. By means of a washer inserted in the opposed end of the sleeve, motion in the other direction is prevented. The axial locking may also be effected in such a manner that the end portions of the raceway are folded alternatingly so that the resulting flaps engage with the sleeve and holder, respectively.

I claim:

1. A ball bushing device adapted to be mounted on a shaft, comprising:
   a. a sleeve element adapted to be disposed around said shaft and comprising an interior wall surface defining a bore within which said shaft can be received;
   b. plural balls disposed within said sleeve element and adapted to be maintained adjacent to said shaft; and
   c. a raceway structure located between said balls and said sleeve element, said raceway structure comprising curved elastic plate members having a substantially concavo-convex configuration and comprising a central portion and end portions, the convex surface facing toward said balls and the concave surface facing toward said sleeve element and in an unloaded condition said central portion being disposed closer to said shaft and more remote from said sleeve element than said end portions.

2. A ball bushing device as in claim 1, wherein said concave surface abuts said sleeve element.

3. A ball bushing device as in claim 2, further comprising holder means for guiding said balls, said holder means being located between said balls and said sleeve element.

* * * * *